US012793104B2

(12) United States Patent
Cho et al.

(10) Patent No.: US 12,793,104 B2
(45) Date of Patent: Nov. 10, 2026

(54) ARTIFICIAL INTELLIGENCE BASED ROOM PERSONALIZED DEMAND MODEL

(71) Applicant: Oracle International Corporation, Redwood Shores, CA (US)

(72) Inventors: Sanghoon Cho, Columbia, SC (US); Andrew Vakhutinsky, Sharon, MA (US); Saraswati Yagnavajhala, Johns Creek, GA (US)

(73) Assignee: Oracle International Corporation, Redwood Shores, CA (US)

( * ) Notice: Subject to any disclaimer, the term of this patent is extended or adjusted under 35 U.S.C. 154(b) by 317 days.

(21) Appl. No.: 16/784,634

(22) Filed: Feb. 7, 2020

(65) Prior Publication Data

US 2021/0117998 A1 Apr. 22, 2021

Related U.S. Application Data

(60) Provisional application No. 62/923,779, filed on Oct. 21, 2019.

(51) Int. Cl.
*G06Q 30/0283* (2023.01)
*G06F 17/18* (2006.01)
(Continued)

(52) U.S. Cl.
CPC ......... *G06Q 30/0283* (2013.01); *G06F 17/18* (2013.01); *G06F 18/232* (2023.01);
(Continued)

(58) Field of Classification Search
None
See application file for complete search history.

(56) References Cited

U.S. PATENT DOCUMENTS

| | | | |
|---|---|---|---|
| 7,167,834 | B1 | 1/2007 | Kelly et al. |
| 8,145,536 | B1 | 3/2012 | Goel |

(Continued)

FOREIGN PATENT DOCUMENTS

| | | | |
|---|---|---|---|
| EP | 2120194 | A1 | 11/2009 |
| JP | 2001222582 | A | 8/2001 |

(Continued)

OTHER PUBLICATIONS

Van Ryzin et al. An expectation-maximization method to estimate a rank-based choice model of demand, Aug. 9, 2016. Operations Research. (Year: 2016).*

(Continued)

*Primary Examiner* — Jerry O'Connor
*Assistant Examiner* — Matthew H Divelbiss
(74) *Attorney, Agent, or Firm* — Potomac Law Group PLLC

(57) ABSTRACT

Embodiments model demand and pricing for hotel rooms. Embodiments receive historical data regarding a plurality of previous guests, the historical data including a plurality of attributes including guest attributes, travel attributes and external factors attributes. Embodiments generate a plurality of distinct clusters based the plurality of attributes using machine learning soft clustering and segment each of the previous guests into one or more of the distinct clusters. Embodiments build a model for each of the distinct clusters, the model predicting a probability of a guest selecting a certain room category and including a plurality of variables corresponding to the attributes. Embodiments eliminate insignificant variables of the models and estimate model parameters of the models, the model parameters including coefficients corresponding to the variables. Embodiments determine optimal pricing of the hotel rooms using the model parameters and a personalized pricing algorithm.

18 Claims, 11 Drawing Sheets

(51) Int. Cl.

| | |
|---|---|
| ***G06F 18/232*** | (2023.01) |
| ***G06N 5/01*** | (2023.01) |
| ***G06N 20/00*** | (2019.01) |
| ***G06Q 30/0201*** | (2023.01) |
| ***G06Q 30/0204*** | (2023.01) |
| ***G06Q 50/12*** | (2012.01) |

(52) U.S. Cl.

CPC ............... *G06N 5/01* (2023.01); *G06N 20/00* (2019.01); *G06Q 30/0204* (2013.01); *G06Q 30/0206* (2013.01); *G06Q 50/12* (2013.01)

(56) References Cited

U.S. PATENT DOCUMENTS

| | | | |
|---|---|---|---|
| 2001/0021914 | A1 | 9/2001 | Jacobi et al. |
| 2005/0144075 | A1 | 6/2005 | Magowan et al. |
| 2006/0149586 | A1 | 7/2006 | Brown |
| 2006/0229932 | A1 | 10/2006 | Zollo et al. |
| 2007/0075136 | A1 | 4/2007 | Jacob |
| 2009/0287629 | A1 | 11/2009 | Gabriel et al. |
| 2010/0121665 | A1 | 5/2010 | Boyer |
| 2010/0185579 | A1 | 7/2010 | Hong et al. |
| 2011/0087679 | A1 | 4/2011 | Rosato et al. |
| 2011/0295762 | A1 | 12/2011 | Scholz et al. |
| 2013/0151462 | A1 | 6/2013 | Ledlie |
| 2013/0246146 | A1 | 9/2013 | Fischer et al. |
| 2014/0207947 | A1* | 7/2014 | Thomas ................ H04L 67/535 709/224 |
| 2014/0222518 | A1* | 8/2014 | Adkins .................. G06Q 50/12 705/7.35 |
| 2014/0278683 | A1 | 9/2014 | Kennell et al. |
| 2014/0310072 | A1 | 10/2014 | Wojciechowski |
| 2015/0170105 | A1* | 6/2015 | Lim ..................... G06Q 10/109 705/7.19 |
| 2015/0310300 | A1 | 10/2015 | Hou et al. |
| 2016/0170996 | A1* | 6/2016 | Frank ................ G06F 16/24578 707/748 |
| 2016/0267402 | A1 | 9/2016 | Szabo |
| 2017/0068890 | A1 | 3/2017 | Thompson |
| 2017/0235626 | A1* | 8/2017 | Zhang ................. G06F 11/3452 714/26 |
| 2018/0047036 | A1 | 2/2018 | Zhang et al. |
| 2019/0095454 | A1 | 3/2019 | Sahadi |
| 2019/0156440 | A1 | 5/2019 | Wang et al. |
| 2019/0205939 | A1 | 7/2019 | Lal et al. |

FOREIGN PATENT DOCUMENTS

| | | | |
|---|---|---|---|
| JP | 2002092438 | A | 3/2002 |
| JP | 2002312440 | A | 10/2002 |
| JP | 2016148920 | A | 8/2016 |
| JP | 2018018368 | A | 2/2018 |
| WO | WO200043927 | * | 7/2000 |
| WO | 2013131186 | A1 | 9/2013 |
| WO | 2017056368 | A1 | 4/2017 |
| WO | 2019084605 | A1 | 5/2019 |

OTHER PUBLICATIONS

Friedman et al., "Regularization Paths for Generalized Linear Models via Coordinate Descent", Journal of Statistical Software, Jan. 2010, vol. 33, issue 1.

Li, Y., Wang, B. and Caudillo-Fuentes, L.A. (2013) Modeling a hotel room assignment problem. Journal of Revenue and Pricing Management 12: 120-127.

International Search Report and Written Opinion issued in the corresponding International Application No. PCT/US2020/046618, mailed on Nov. 18, 2020.

International Search Report and Written Opinion issued in the corresponding International Application No. PCT/US2020/046611, mailed on Nov. 18, 2020.

Elizalde, "How to Use a Scorecard to Prioritize Features", IoT Strategy for Product Teams, 2019, pp. 1-15, retrieved from: https://web.archive.org/web/2019031321344 7/https://danielelizalde.com/product_ management_scorecard/.

Gong, "A Collaborative Filtering Recommendation Algorithm Based on User Clustering and Item Clustering," Journal of Software, 2010, vol. 5.7, pp. 1-2 (Abstract only).

Ivanescu, "Some Network Flow Problems Solved with Pseudo-Boolean Programming", Operation Research, 1965, vol. 13 (3), pp. 388-399, Informs.

Perdomo et al., "Operating Theatre Scheduling Using Lagrangian Relaxation", Proceedings form the 2006 International Conference on Service Systems and Service Management, 2006, Troyes, France, pp. 1-6.

Ramzan et al., "An Intelligent Data Analysis for Recommendation Systems Using Machine Learning," Scientific Programming, 2019, pp. 1-2, (abstract only), Hindawi Limited.

Xu et al., "The antecedents of customer satisfaction and dissatisfaction toward various types of hotels: A text mining approach," International Journal of Hospitality management, 2016, vol. 55, pp. 57-69, Elsevier, Amsterdam, Netherlands.

Rajiv Banker, "Association of Nonfinancial Performance Measures with the Financial Performance of a Lodging Chain", Nov. 2005, Cornell University, vol. 46, No. 4, pp. 394-412. (Year: 2005).

Sato et al., "Aircraft Assignment using Lagrangian Relaxation Method", IEEJ Transactions on Electronics Information and Systems, Japan, The Institute of Electrical Engineers of Japan, vol. 123, No. 7, pp. 1341-1349, (2003).

* cited by examiner $$L(\theta) = \underbrace{\lambda^{I(r_t=1)} \times \frac{\exp(\beta_0+\beta_1 p_t)}{1+\exp(\beta_0+\beta_1 p_t)}^{I(r_t=1)I(b_t=1)} \times \left\{\pi_g(x_t, p_t) \times \frac{\exp(x_t'\delta_k^g+p_t\gamma_k^g)}{1+\sum_{k=2}^{K}\exp(x_t'\delta_k^g+p_t\gamma_k^g)}^{I(r_t=1)I(b_t=1)I(d_t=k)I(z_t=g)}\right\}}_{\text{Arrived and Chose the room type k within the cluster g}}$$

$$\times \underbrace{\frac{1}{1+\exp(\beta_0+\beta_1 p_t)}^{I(r_t=1)I(b_t=0)}}_{\text{Arrived but did not book}} \times \underbrace{(1-\lambda)^{I(r_t=0)}}_{\text{Did not arrive}}$$

Fig. 7

$$E\{logL(\theta)\} = \sum_{t=1}^{T} \mathrm{I}(\mathrm{r}_t = 1)\log\lambda + I(b_t = 1)I(r_t = 1)\log\frac{\exp(\beta_0 + \beta_1 p_t)}{1 + \exp(\beta_0 + \beta_1 p_t)}$$

$$+ I(b_t = 1)I(r_t = 1)\sum_{k=1}^{K} I(d_t = k)\sum_{g=1}^{G} E(z_t = g)\{\log\pi_g(x_t, p_t) + \log\frac{\exp(x_t'\delta_k^g + p_t\gamma_k^g)}{1 + \sum_{k=2}^{K}\exp(x_t'\delta_k^g + p_t\gamma_k^g)}\}$$

$$+ I(b_t = 0)E(r_t = 1)\log\frac{1}{1+\exp(\beta_0+\beta_1 p_t)} + E(r_t = 0)\log(1 - \lambda) - \underbrace{\sum_{g=1}^{G}\sum_{k=1}^{K}\sum_{j=1}^{J}\kappa\{\left|\delta_{kj}^g\right| + |\gamma_k^g|\}}_{\text{LASSO Penalty Function}}$$

$\kappa$ : Lasso penalty tuning parameter

LASSO Penalty Function 10-fold cross validation

Fig. 8

- Misclassification ratio: Proposed (0.30) vs. Single MNL (0.37)

| Parameter | Value | Interpretation |
| --- | --- | --- |
| **Visiting the Hotel Reservation System Probability ($\lambda$)** | 0.712 | 71.2% of all customers in the market visited the hotel reservation system. |
| **Booking ($\beta_0$, $\beta_1$): $\beta_1$: Price Coefficient** | (-2.46, -0.0033) | • If price is high, customers are less likely to book.<br>• 7.87% of customers who visited the hotel reservation system made a booking at the average price. |
| **Booking Probability at the Average Price** | 0.0787 | |
| **Summary** | 0.712*0.0787 = 0.056 | 5.6% of all customers in the market booked our hotel. |

Fig. 9

1. Excluded Variables

- 64 coefficients out of 157 coefficients

| | | Intercept | VIP (1=VIP; 0=O.W) | # of Adults | # of Children | LAG (Booking Date – Arrival Date) | Length of Stay | MAX Occupancy | Square Unit Size | Smoking | Holiday or Weekend | Destination Temperature | Destination Precipitation | Price |
|---|---|---|---|---|---|---|---|---|---|---|---|---|---|---|
| Cluster 1 | Deluxe-- City View | 2.358 | 0.000 | 0.000 | 0.007 | 0.000 | 0.005 | 0.000 | -0.290 | 1.315 | -0.115 | -0.065 | 0.000 | -1.087 |
| | Deluxe-- Water View | 3.496 | 0.000 | 0.054 | -0.063 | 0.015 | -0.018 | -0.287 | 0.000 | 0.000 | 0.000 | 0.128 | 0.000 | -0.007 |
| | Suite-- City View | 0.210 | 0.000 | 0.033 | 0.000 | 0.000 | 0.000 | 3.848 | 0.126 | 0.000 | 0.000 | 0.000 | 0.000 | 0.230 |
| | Suite-- Water View | -0.105 | 0.000 | -0.091 | 0.000 | 0.000 | 0.000 | 3.549 | 0.217 | 0.000 | 0.000 | 0.000 | 0.000 | 0.007 |
| | Superior-- City View | 0.020 | 0.000 | 0.000 | 0.000 | 0.000 | 0.000 | 0.000 | 0.000 | 0.000 | 0.000 | 0.000 | 0.000 | -0.104 |
| | Superior-- Water View (Baseline) | 0.000 | 0.000 | 0.000 | 0.000 | 0.000 | 0.000 | 0.000 | 0.000 | 0.000 | 0.000 | 0.000 | 0.000 | 0.000 |
| Cluster 2 | Deluxe-- City View | 0.670 | 0.000 | -0.036 | 0.147 | 0.235 | 0.275 | 2.313 | 0.000 | 3.524 | 0.321 | 0.000 | 0.350 | -1.310 |
| | Deluxe-- Water View | 0.950 | 0.175 | -0.016 | 0.000 | 0.247 | 0.157 | 2.242 | 0.000 | 0.046 | 0.244 | 0.000 | 0.232 | -0.264 |
| | Suite-- City View | 0.669 | 0.000 | 0.129 | 0.000 | -0.276 | 0.000 | 4.050 | 1.387 | 0.000 | 0.000 | 0.000 | 0.000 | -0.250 |
| | Suite-- Water View | 0.338 | 0.000 | 0.000 | -0.095 | 0.000 | 0.000 | 4.095 | 1.070 | -0.399 | 0.000 | 0.000 | 0.000 | -0.303 |
| | Superior-- City View | 1.084 | 0.000 | -0.011 | 0.000 | 0.000 | 0.000 | -0.287 | 0.000 | 0.000 | -0.125 | 0.000 | -0.065 | -0.933 |
| | Superior-- Water View (Baseline) | 0.000 | 0.000 | 0.000 | 0.000 | 0.000 | 0.000 | 0.000 | 0.000 | 0.000 | 0.000 | 0.000 | 0.000 | 0.000 |

Fig. 10

Numerical Study

1104

1102

| | Deluxe | Superior | Suite |
|---|---|---|---|
| Price | $100 | $120~$300 | $350 |
| Inventory | 63 | 12 | 80 |

Total Arrivals: 100

| Superior Room Price | Demand | | |
|---|---|---|---|
| | Deluxe | Superior | Suite |
| $120.0 | 13 | 4 | 44 |
| $140.0 | 13 | 4 | 44 |
| $160.0 | 13 | 4 | 44 |
| $180.0 | 13 | 4 | 44 |
| $200.0 | 13 | 4 | 44 |
| $220.0 | 12 | 3 | 46 |
| $240.0 | 11 | 2 | 48 |
| $260.0 | 10 | 2 | 49 |
| $280.0 | 9 | 1 | 51 |
| $300.0 | 8 | 1 | 52 |

ARTIFICIAL INTELLIGENCE BASED ROOM PERSONALIZED DEMAND MODEL

CROSS REFERENCE TO RELATED APPLICATIONS

This application claims priority of U.S. Provisional Patent Application Ser. No. 62/923,779, filed on Oct. 21, 2019, the disclosure of which is hereby incorporated by reference.

FIELD

One embodiment is directed generally to a computer system, and in particular to a computer system that generates an artificial intelligence based room personalized demand model.

BACKGROUND INFORMATION

Increased competition in the hotel industry has caused hoteliers to look for more innovative revenue management policies, such as personalized pricing and recommendations. Over the past few years, hoteliers have come to understand that not all guests are equal and a traditional one-size-fits-all policy might prove to be ineffective. Therefore, a need exists for hotels to profile their guests and offer them the right product/service at the right price with the goal of maximizing their profit.

SUMMARY

Embodiments model demand and pricing for hotel rooms. Embodiments receive historical data regarding a plurality of previous guests, the historical data including a plurality of attributes including guest attributes, travel attributes and external factors attributes. Embodiments generate a plurality of distinct clusters based the plurality of attributes using machine learning soft clustering and segment each of the previous guests into one or more of the distinct clusters. Embodiments build a model for each of the distinct clusters, the model predicting a probability of a guest selecting a certain room category and including a plurality of variables corresponding to the attributes. Embodiments eliminate insignificant variables of the models and estimate model parameters of the models, the model parameters including coefficients corresponding to the variables. Embodiments determine optimal pricing of the hotel rooms using the model parameters and a personalized pricing algorithm.

BRIEF DESCRIPTION OF THE DRAWINGS

Further embodiments, details, advantages, and modifications will become apparent from the following detailed description of the embodiments, which is to be taken in conjunction with the accompanying drawings.

FIG. 7 illustrates an example of a likelihood function in accordance to one embodiment.

FIG. 8 illustrates a variable selection algorithm in accordance to an embodiment.

FIGS. 9 and 10 illustrate the results of embodiments of the invention using an experimental dataset to predict the possibility of a particular guest selecting a certain room category.

DETAILED DESCRIPTION

Figure 1:
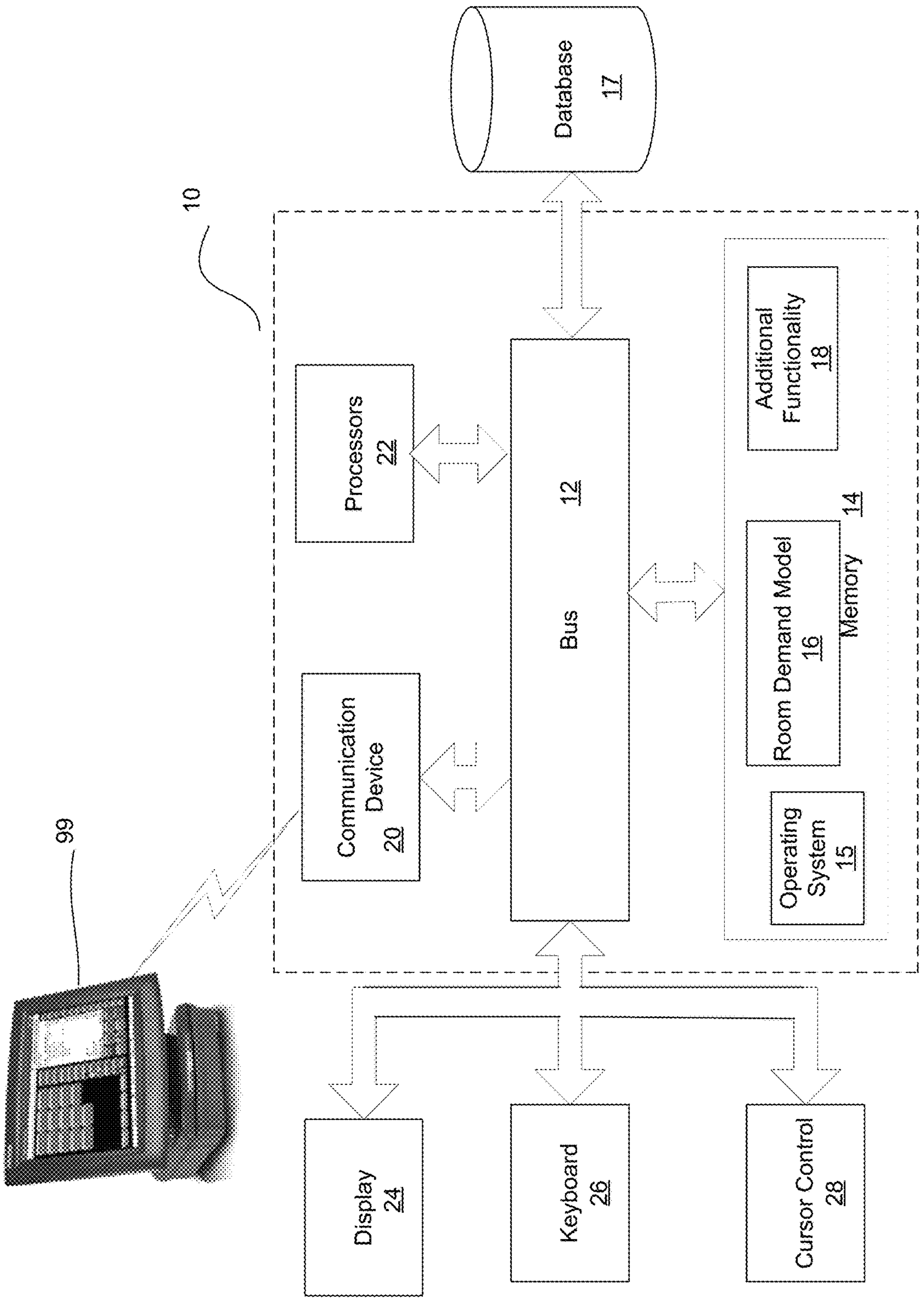
FIG. 1 is a block diagram of a computer server/system in accordance with an embodiment of the present invention.

Embodiments utilize artificial intelligence ("AI") to predict demand for multiple hotel room categories based on the individual attributes of the hotel guests, their booking channels, and room category features, including the offered price. Embodiments further estimate the fraction of the "no-purchase guests", or the number of the guests who decide not to book the hotel rooms, which is an unobservable variable. Embodiments output the probability of each individual guest to book a room in a specific room category. Embodiments further estimate the relative monetary value of the room features for each cluster of the hotel guests. An example of the room feature could be the type of the bed (e.g., king vs. queen), view (e.g., ocean or garden), size of room, or type of room (e.g., suite vs. single room). To generate a personalized demand model based on guest characteristics as well as room features, embodiments use a combination of clustering and a mixture of the multinomial choice modeling.

Traditional revenue management ("RM") practices in the hotel industry use capacity control mechanisms, specifically controlling room availabilities for different categories of products, typically using length-of-stay controls. In general, the hotel industry does not use advanced demand models based on the individual attributes of the hotel guests, their booking channels and room category features. However, operating conditions have significantly changed for the hotel industry in recent years. Given the transparency of room prices via the Internet, corporate travel management companies, leisure travel agencies, and brand websites moved to a common distribution platform and started reaching into each other's customer bases. Search engines then drove this transparency even further, aggregating the online rates from all distribution channels into a single interface and showed price as one of the most prominent differentiators between hotel rooms.

In this competitive environment, traditional RM solutions, which operate under the assumption that the demand for a product does not depend on what other choices are available, are much less effective in segmenting guests with well-fenced restrictions. Therefore, there is a need for hotels to move towards price optimization solutions based on guests' willingness-to-pay and price elasticity.

Especially for the online sales, the personalized demand modeling and price optimization have seen relatively little use in the hotel industry partially due to the difficulty of directly applying these methods to the hotel booking. Most of the demand-forecasting tools currently used by the hotel industry are aimed at providing the overall number of bookings based on time series analysis, thus ignoring demand price elasticity and room category features. These demand modeling tools are often ineffective in the presence of the heterogeneous guests with significantly different willingness-to-pay.

In contrast to known solutions, embodiments implement a personalized strategy by first dividing the guest base into distinct clusters by applying a machine learning-based soft clustering model based on the guest, travel, and external attributes. Known solutions often accomplished this clustering based on only easily separate guests such as the trip purpose (e.g., leisure or business) given the assumption of homogeneous guests. This may be too restrictive to apply in practice since guests have their own characteristics which require different choice models. Even for some guests with similar attributes, their choice probabilities may depend on external attributes such as local events, holidays and the weather at the origin and the destination. Therefore, embodiments relax the strong assumption of homogeneity of guests in the choice modeling.

Embodiments include two prior sequential steps of arrival and booking decision steps. A customer can arrive (or not) in a hotel room booking system. If arrived, the customer then decides to make a reservation (or not) at the hotel. Once they have arrived at the booking system and decided to reserve a room, they would choose a room type. However, in general, observable data is available only for the customers who purchased any product and if embodiments merely fitted the demand model to the observable data, it may lead to a biased estimation and not incorporate price sensitivity appropriately. To avoid these possible biases, embodiments incorporate the no-purchase cases where customers may not arrive into the booking system because they are not interested in the hotel or customers arrived at the booking system but then leave without a purchase due to high price or the lack of available rooms. Therefore, embodiments can account for the no-purchase cases and competitors (or outside options), which may affect a customer's initial decision as compared to the previous industry solutions where they do not consider those factors.

Embodiments cluster the guests into several groups, or clusters, where the guests with similar attributes are assigned to the same cluster. Moreover, embodiments implement a soft clustering approach by allowing each guest to belong to multiple clusters with certain probabilities. Embodiments then build a multinomial choice model for each cluster, which predicts the probability of selecting a certain room category by each particular guest. Embodiments determine the number of groups using a data-driven cross-validation approach to determine the optimal number of clusters.

Since the number of attributes is generally very large, the data within each group may be sparse, leading to inaccurate predictions. In order to mitigate this, embodiments implement a "Lasso" regularization method to set the coefficients for the least important model covariates to zero by maximizing the penalized likelihood function of the mixture multinomial choice model.

In order to estimate the parameters (i.e., arrival rates, the probabilities of belonging to each group and each covariates parameters), embodiments use the Expectation-Maximization ("EM") algorithm after performing random forest-based soft clustering to find the initial clustering probabilities. Because of the two unobservable factors (i.e., no-purchase process and cluster process), embodiments account for those latent factors. Finally, the parameters extracted from the above are plugged into the personalized pricing algorithm for determining the optimal price of each room type for each guest.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, when implemented as a web server or cloud based functionality, system 10 is implemented as one or more servers, and user interfaces such as displays, mouse, etc. are not needed.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include room demand model module 16 that generates a room demand model to maximize hotel room revenue, and all other functionality disclosed herein. System 10 can be part of a larger system. Therefore, system 10 can include one or more additional functional modules 18 to include the additional functionality, such as the functionality of a Property Management System ("PMS") (e.g., the "Oracle Hospitality OPERA Property" or the "Oracle Hospitality OPERA Cloud Services") or an enterprise resource planning ("ERP") system. A database 17 is coupled to bus 12 to provide centralized storage for modules 16 and 18 and store guest data, hotel data, transactional data, etc. In one embodiment, database 17 is a relational database management system ("RDBMS") that can use Structured Query Language ("SQL") to manage the stored data. In one embodiment, a specialized point of sale ("POS") terminal 99 generates transactional data and historical sales data (e.g., data concerning transactions of hotel guests/customers) used for performing the optimization. POS terminal 99 itself can include additional processing functionality to perform room assignment optimization in accordance with one embodiment and can operate as a specialized room assignment optimization system either by itself or in conjunction with other components of FIG. 1.

In one embodiment, particularly when there are a large number of hotel locations, a large number of guests, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Figure 2:
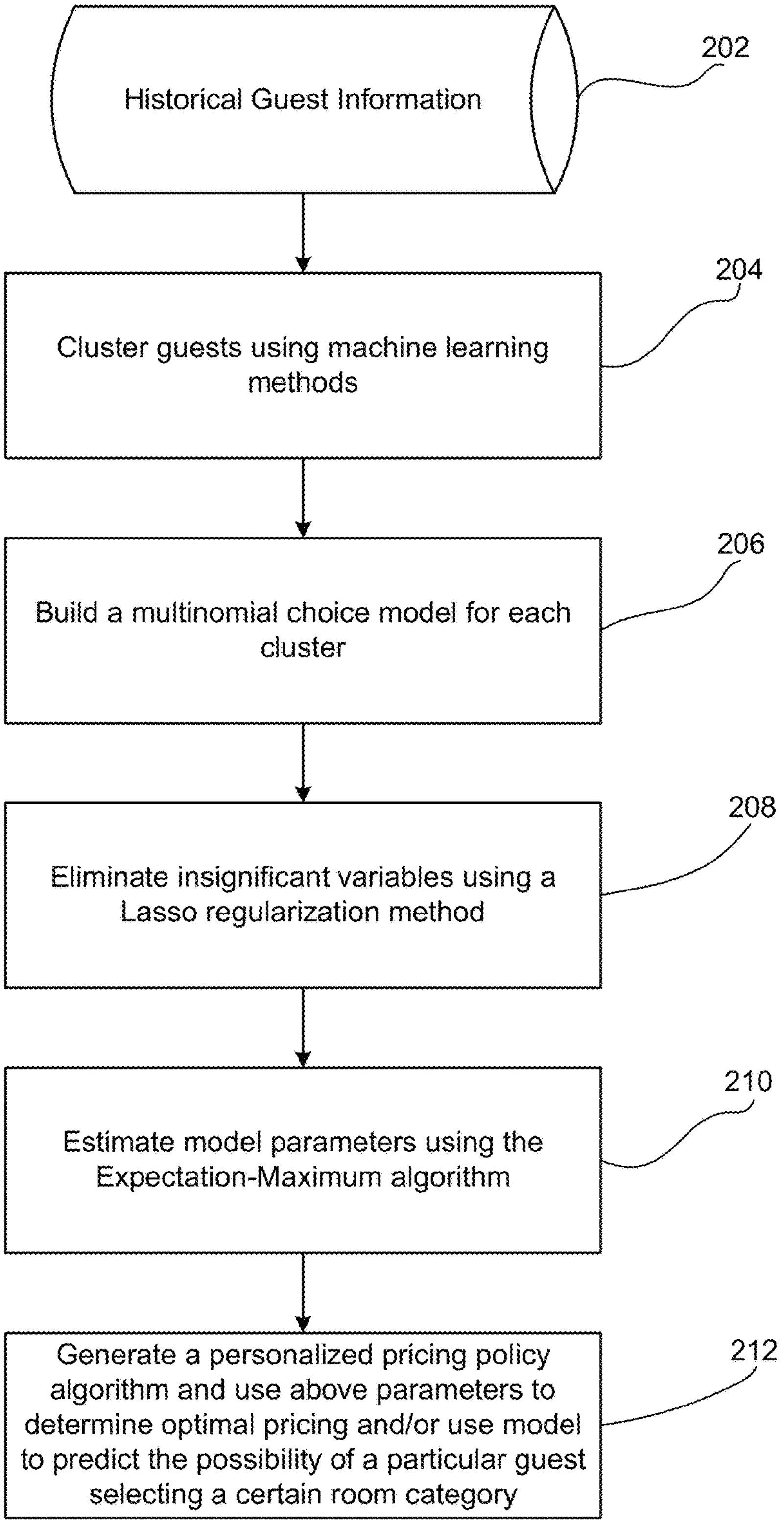
FIG. 2 is a flow diagram that illustrates the functionality of the room demand model module of FIG. 1 in accordance to embodiments.

FIG. 2 is a flow diagram that illustrates the functionality of room demand model module 16 of FIG. 1 in accordance to embodiments. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In general, the functionality of FIG. 2 models personalized demand models based on guest's characteristics as well as room features using an approach that includes a combination of clustering and a mixture of multinomial choice modeling. At 202, historical reservation data and guest information is received from an input dataset/database 17. In one embodiment, input dataset 17 is an "OPERA" database from Oracle Corp. and includes details on guests of a single hotel or a group of related hotels such as a chain of hotels as well as available rooms. In other embodiments, a database of data regarding guests and rooms for any type of PMS can be used. In embodiments, input dataset 17 is received via electronic communications from a computing device under the control of the hotel operator and is then parsed by system 10 to extract the information needed for the subsequent functionality disclosed below.

Since the no-arrival and no-booking customers are not recorded in database 17, they are treated as latent or unobserved variables. As disclosed in more detail below, these latent variables are estimated using an Expectation-Maximum ("EM") algorithm, which iteratively fits the demand model to find the most likely estimate for the rate of all customers including the no-arrival and no-booking customers.

At 204, embodiments cluster guests using machine learning methods (i.e., soft clustering).

To implement a personalized strategy, embodiments first divide the guest base into distinct clusters by applying a machine learning-based soft clustering model based on the guest, travel, and external attributes. Known solutions typically accomplish this clustering based on only easily separable guest attributes, such as the trip purpose (e.g., leisure vs. business) given the assumption of homogeneous guests. This may be too restrictive to apply in practice since guests have their own characteristics which require different choice models. Even for some guests with similar attributes, their choice probabilities may depend on external attributes such as local events, holidays, and weather at origin and destination. Therefore, embodiments relax the strong assumption of homogeneity of guests in the choice modeling.

Further, embodiments add two prior sequential steps including arrival and booking decision steps. Customers arrive (or not) in the booking system. If arrived, then they decide whether making a reservation (or not) in the hotel. Once they arrived at the booking system and decide to reserve a room, they would choose a room type.

However, the data is available only for the customers who purchased any product and if the demand model is only fitted to the observable data, it may lead to a biased estimation and not incorporate price sensitivity appropriately. To avoid these possible biases, embodiments incorporate the no-purchase cases where customers may not arrive into the booking system because they are not interested in the hotel or customers arrived in the booking system, but they would leave without purchase due to high price or lack of available rooms. Therefore, embodiments can account for the no-purchase case and competitors (or outside options), which may affect a customer's initial decision, as compared to known solutions that do not consider those factors.

At 206, embodiments perform choice modeling that develops a mixture multinomial logit model ("MNL") model to estimate the demand. A multinomial choice model is built for each cluster of 204, which predicts the probability of selecting a certain room category by each particular guest. Embodiments determine the number of groups using a data-driven cross-validation approach to determine the optimal number of clusters.

At 208, embodiments perform variable selection by eliminating insignificant variables using a Lasso regularization method. Since the number of attributes is usually fairly large, the data within each group may be sparse, leading to inaccurate prediction. In order to mitigate this, the Lasso regularization method sets the coefficients for the least important model covariates to zero by maximizing the penalized likelihood function of the mixture multinomial choice model.

At 210, embodiments estimate model parameters using the Expectation-Maximum ("EM") algorithm. In order to estimate the parameters (i.e., arrival rates, the probabilities of belonging to each cluster group and each covariates parameters), embodiments use the EM algorithm after performing random forest-based soft clustering to find the initial clustering probabilities. Embodiments assume a parametric model to predict the demand. Generally speaking, a parametric model is a family of a probability distribution that has a finite number of parameters that determine the characteristics of the distribution. The parameters of the model are estimated based on the data to find the values of the parameters that provides the minimal deviation from the observed data. In embodiments, the model has three sets of parameters. First, the probabilities of belonging to each cluster group is estimated by performing random forest-based soft clustering. Next, the arrival rates and booking choice parameters are estimated (i.e., the probability of arriving into the booking system and the booking choice probability (if customers arrived)). Finally, each attribute parameters are estimated, such as guest attributes, travel attributes and external factors. Because embodiments include two unobservable factors (i.e., no-purchase process and cluster process), embodiments account for those latent factors.

At 212, embodiments generate a personalized pricing policy algorithm to maximize hotel revenue. The parameters extracted from the above functionality is plugged into a personalized pricing algorithm to determine the optimal price of each room type for each guest. Further, embodiments can use the model to predict the possibility of a particular guest selecting a certain room category.

In addition of the functionality of FIG. 2, embodiments use the determined optimal pricing to store and update databases that provide prices to online services. These updates can be frequent (e.g., multiple times a day or hour) and cause electronic devices to be automatically modified based on modified prices. Further, embodiments may cause hotels to be more fully utilized, thus resulting in additional services being used in the hotels. Further, embodiments cause the optimized prices to be sent over a network which causes other computing devices/servers to modify prices in a pricing database according to the revised optimized prices.

Personalized Demand Model

Embodiments consider K-types of hotel rooms with K different prices. The outcome variable y, as a choice of room purchased, takes a value from 1, . . . , K. The demand for the hotel rooms can vary across the individual attributes of the hotel customers, their booking channels and room category features. x denotes all of the features affecting the choice of a hotel room. The personalized demand model is the outcome y given x.

One challenging issue is that data is only available for observed purchases of the hotel rooms. If the no purchase cases are ignored and the demand model is only based on the purchased cases, it leads to biases by underestimating price sensitivity. Some customers might decide to no purchase because of higher price than their willingness to pay. To avoid such biases, embodiments model the customer arrival process by dividing a day into a small discrete time slices, denoted by t=1, . . . , T, during which at most one customer might arrive. Arrival process at time t is modeled as a Bernoulli distribution with the arrival probability denoted by λ. Given an arrival, it is assumed that a customer makes a decision between booking and non-booking any hotel room based on the prices. A logistic regression model is considered for the booking process given the room prices. For the no purchase (no booking), proxy prices can be used such as average prices for each room a day.

Given booking after arrival, guests choose a room among K different rooms according to their own preference given any conditions. For example, the demand depends on guest attributes such as loyalty status, profile preferences, ancillary services, or external attributes such as local events, holidays and weather. To model such a personalized demand, embodiments first segment the guests into G clusters (204 of FIG. 2) based on the information x so that their demand patterns are homogeneous within each cluster but heterogeneous across clusters and then assume a multinomial logit model within each cluster separately (206 of FIG. 2). Since the cluster membership is unknown, a mixture multinomial logit model is assumed where the probabilities of belonging to each cluster are specified as parameters and then estimated from data. This is referred to as a "choice process." The following personalized demand model incorporates the three sequential steps ("demand model steps"):

(i)

$$\text{Arrival}: r_t \sim \text{Bernoulli}(\lambda)$$

(ii)

$$\text{Booking}: \log\frac{B_t}{1-B_t} = \beta_0 + \beta_1 \tilde{p}_t,$$

$$\text{for } r_t = 1$$

(iii)

$$\text{Choice}: \sum_{g=1}^{G} \pi_g(x_t, p_t^k) \prod_{k=1}^{K} \left( \frac{\exp(x_t' \delta_k^g + p_t^k \gamma_k^g)}{1 + \exp(x_t' \delta_k^g + p_t^k \gamma_k^g)} \right)^{I(y_t = k)},$$

$$\text{for } r_t = b_t = 1,$$

where $B_t = \Pr(b_t = 1 | \tilde{p}_t, r_t = 1)$ and $\tilde{p}_t$ denotes a summary statistic of the K room prices at time t such as average, minimum, maximum and etc.

$$p_t^k$$

is the k typed room price at time t and $\pi_g(x_t, p_t) = \Pr(z_t = g | x_t, p_t)$ denotes the probability of belonging the cluster g given $x_t$ and $p_t = (p_{t1}, \ldots, p_{tK})'$, where $z_t$ is a cluster indicator for a customer purchased at time t.

Figure 3:
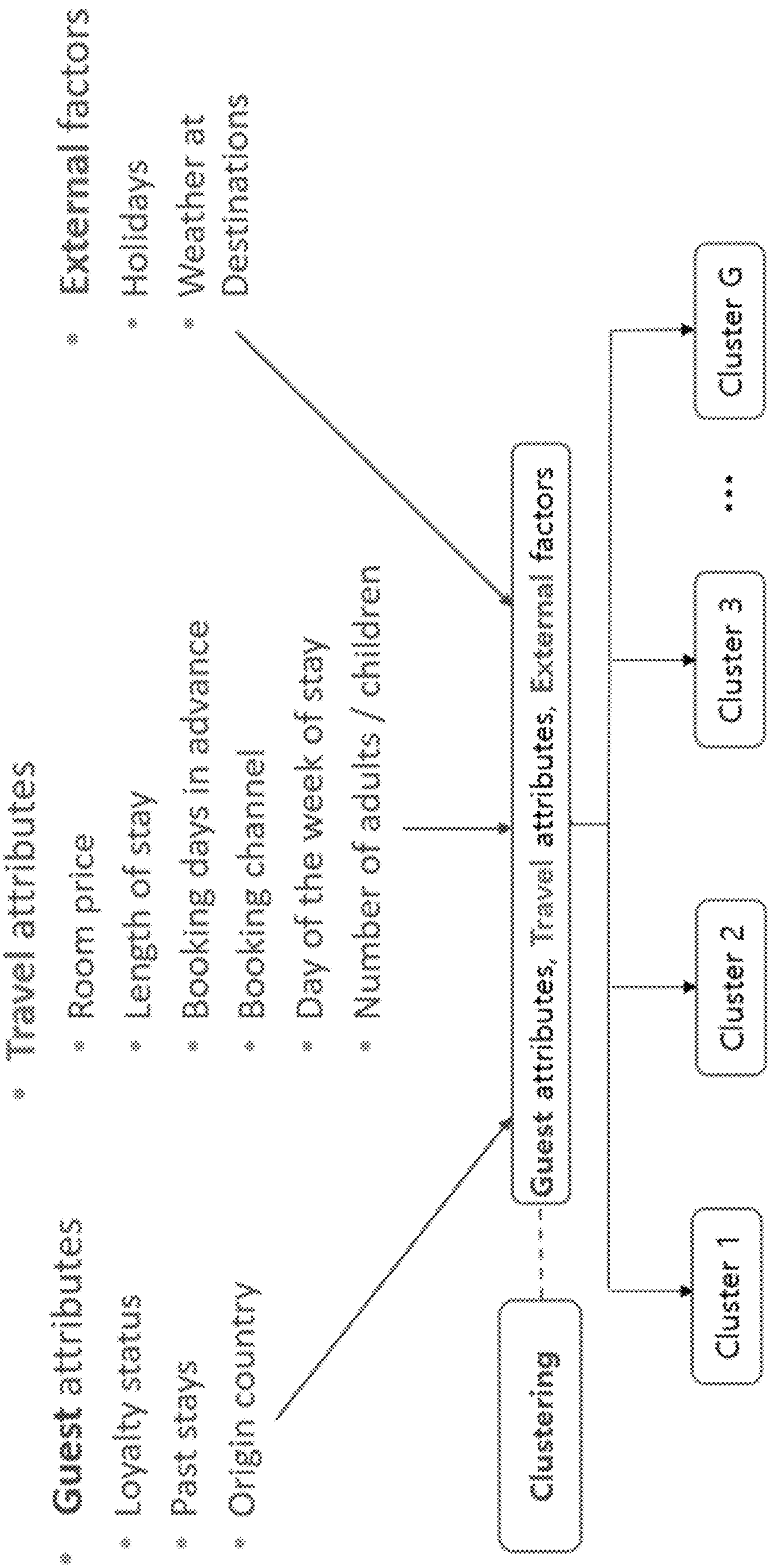
FIG. 3 illustrates an example of clustering based on attributes in accordance to one embodiment.

FIG. 3 illustrates an example of clustering based on attributes in accordance to one embodiment. The number of clusters up to "Cluster G" can be chosen based on the Bayesian Information Criterion ("BIC"). The number of clusters, (e.g., G), is unknown apriori, and therefore G needs to be selected based on the data. BIC is used to determine the number of clusters, and is a consistent and efficient criterion for choosing the number of mixture components under Gaussian distributional assumptions. The attributes can be divided into guest attributes, travel attributes and external factors.

Figure 4:
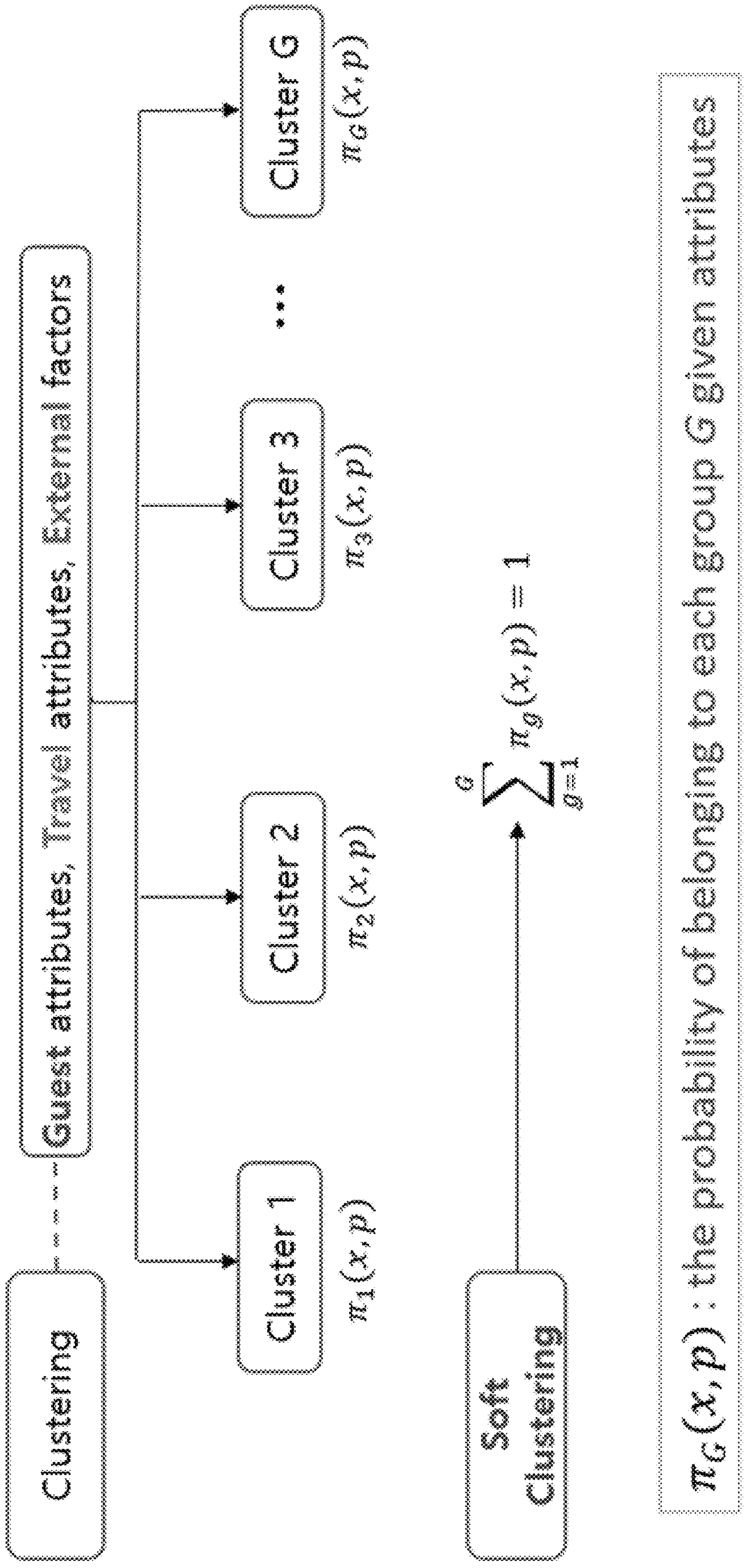
FIG. 4 illustrates a further example of clustering using random forest machine learning for correlation in accordance with one embodiment.

FIG. 4 illustrates a further example of clustering using random forest machine learning for correlation in accordance with one embodiment. Correlation among the variables/attributes can be reduced by selecting parts of the variables. In embodiments, guest attributes, travel attributes and external factors are the variables determining the clustering process through the random forest. Random forest, in one embodiment, implements a repeated decision tree with Bootstrap sampling. 3 or 4 variables are randomly selected from 13 variables within each decision tree. The bootstrap sample size is 500.

Clustering is the process of partitioning data into subgroups so that the data points in each group are more similar to each other, according to some distance measure. Random forest for clustering uses an algorithm that generates a proximity matrix that gives a rough estimate of the distance between samples. Alternative methods for clustering can be used in other embodiments.

Figure 5:
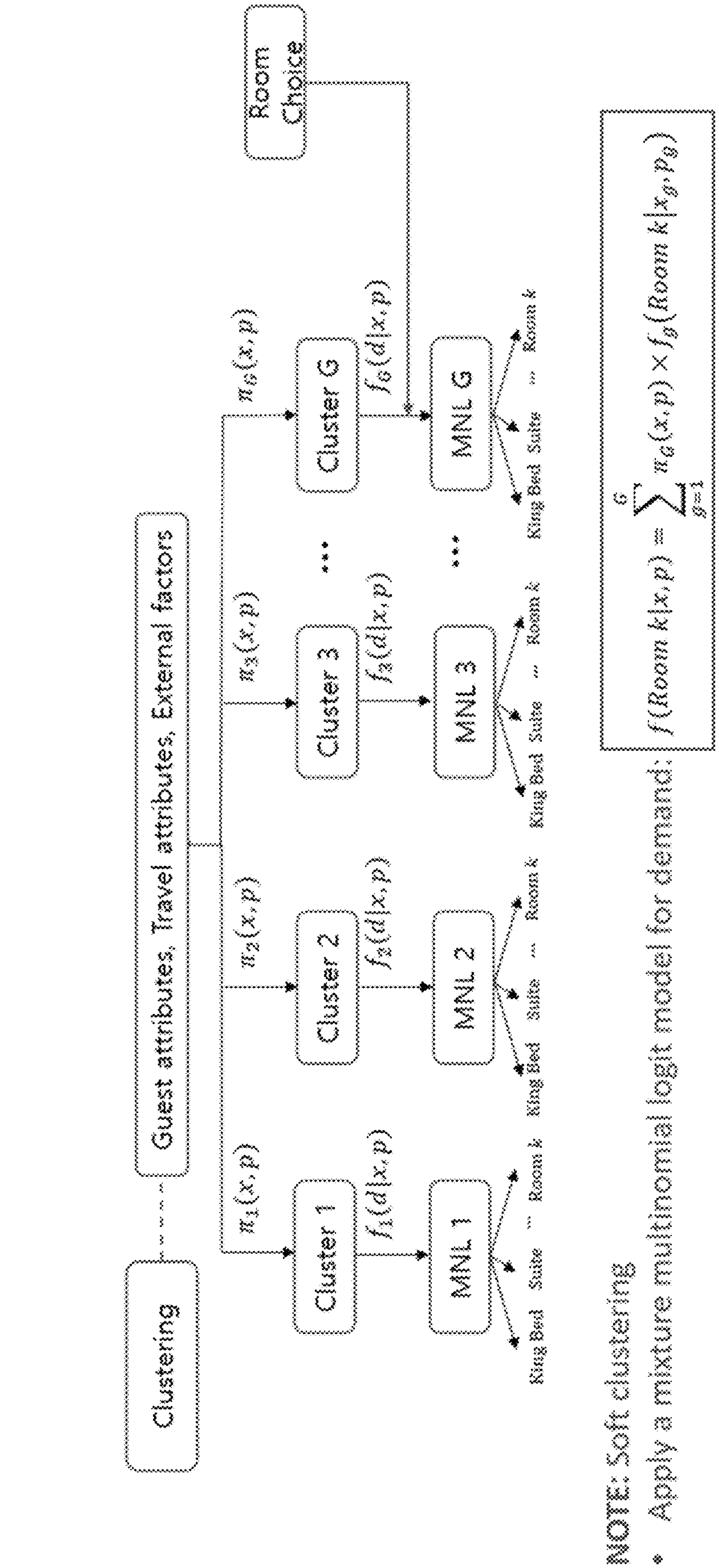
FIG. 5 illustrates an example of applying a mixture MNL model to each cluster to estimate the demand in accordance to one embodiment.

FIG. 5 illustrates an example of applying a mixture MNL model to each cluster to estimate the demand in accordance to one embodiment. Because the customer's demand patterns tend to be different across clusters, the choice model shown in FIG. 5 follows a MNL for each cluster separately (e.g., MNL 1 for Cluster 1, MNL 2 for Cluster 2, etc.).

When analyzing data, it is generally assumed that each observation comes from one specific distribution. However, in practice, assuming that each sample comes from the same distribution might be too restrictive. Often the data are complicated. For example, the data might be skewed-distributed or multimodal. Therefore, in embodiments, mixture models are used to describe such complicated probabilistic behavior of data. A mixture model assumes that each observation is generated from one of G mixture components and within each component, it assumes a specific distribution. In embodiments, the demand for different room types is of interest, which is defined as a categorical variable and modeled as the mixture of Multinomial Logistic (MNL) regression models.

Figure 6:
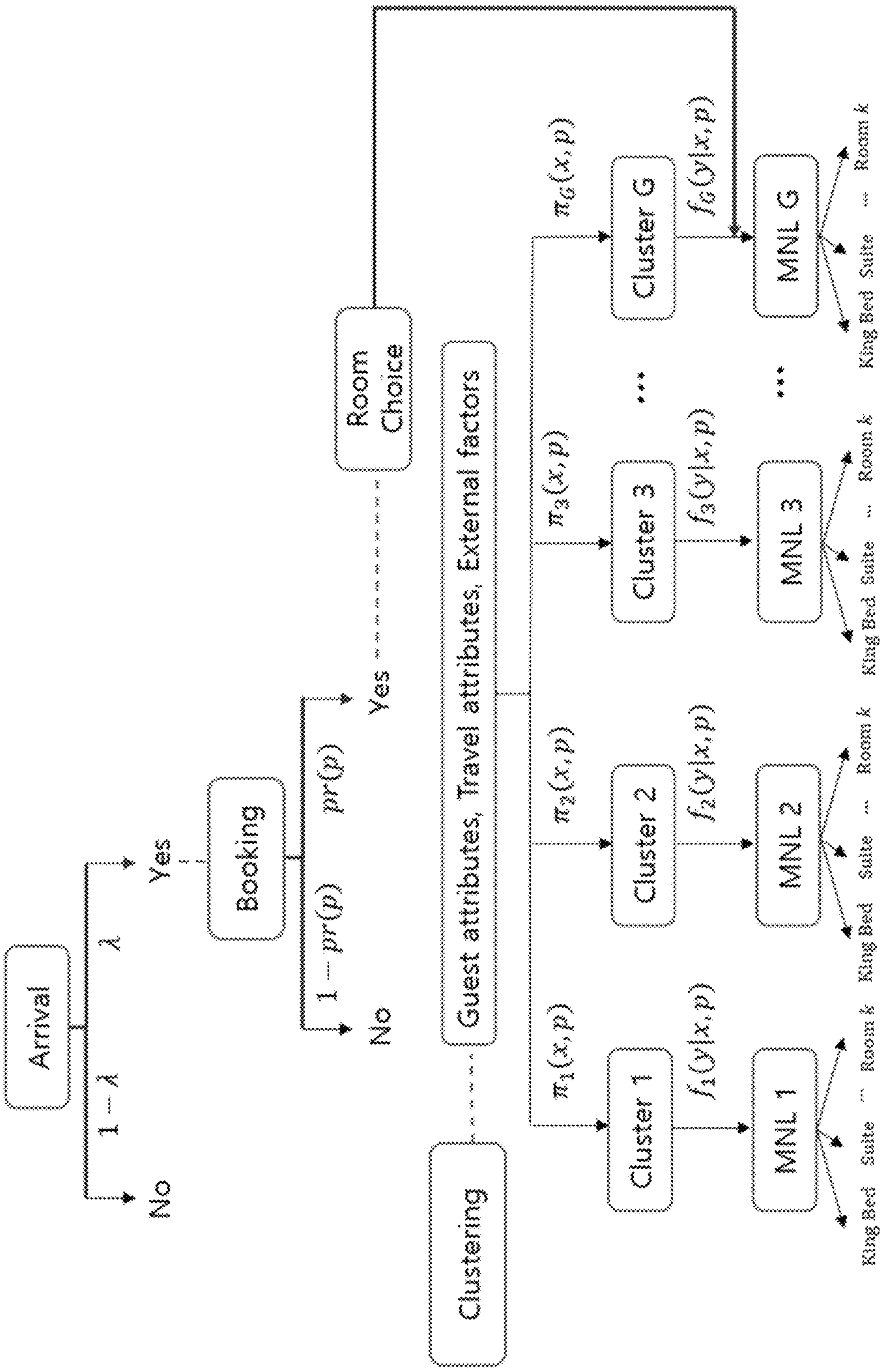
FIG. 6 illustrates the complete personalized demand model in accordance with one embodiment.

FIG. 6 illustrates the complete personalized demand model in accordance with one embodiment. As shown, and as described by the demand model steps above, the model incorporates arrival, booking and room choice. Embodiments can observe only customers that have booked the hotel rooms. The other customers in the market have either never entered the system (no-arrival) or did not book the rooms (no-booking). These unobserved customers are described by what is generally called latent (or unobserved) variables. Statistical methods allow the estimation of these variables by fitting the distribution of the observed variables. Further, the statistical approach used by embodiments allows for distinguishing between no-arrival and no-booking customers.

Specifically, for each time slot t with no booking customers denoted by indicator variable $b_t$=0, it is not known whether arrival indicator variable $r_t$ is 1 or 0. Since for those time slots, $r_t$ is a latent variable, embodiments use the EM algorithm to estimate the model parameters. Here, the EM algorithm is an iterative method to find maximum likelihood estimates of parameters in statistical models that would most closely fit the observed variables.

Model Estimation of the Personalized Model

Embodiments perform model estimation of the personalized model (shown in FIG. 6) using two steps. First, an unsupervised clustering method such as random forest (shown in FIG. 5) is used to compute the probability of belonging to cluster g for each guest who arrived and booked at time t, $\pi_g(x, p_t)$ (referred to as a "segmentation" step). For given the probabilities, embodiments find the maximum likelihood ("ML") estimator of the model parameter $$\theta = \{\lambda, \beta_0, \beta_1, \delta_k^g, \gamma_k^g : k = 1, \ldots, K, g = 1, \ldots, G\}.$$

Since the arrival variable, $\gamma_t$, is unobservable for no purchase cases (i.e., $b_t$=0) and the cluster membership variable, $z_t$, is latent, the EM algorithm is implemented to find the ML estimator. This is referred to as the "EM step."

In connection with the EM algorithm, it is helpful to first consider the complete likelihood function when all the variables $\{\gamma_t, b_t, z_t: t=1, \ldots, T\}$ are observed, which is given by:

$$L(\theta) = \prod_{t=1}^{T} \lambda^{I(\gamma_t=1)} \times \left\{ \frac{\exp(\beta_0 + \beta_1 \tilde{p}_t)}{1 + \exp(\beta_0 + \beta_1 \tilde{p}_t)} \right\}^{I(\gamma_t=1)I(b_t=1)} \times \left\{ \pi_g(x_t, p_t^k) \frac{\exp(x_t' \delta_k^g + p_t^k \gamma_k^g)}{1 + \exp(x_t' \delta_k^g + p_t^k \gamma_k^g)} \right\}^{I(\gamma_t=1)I(b_t=1)I(y_t=k)I(z_t=g)} \times \left\{ \frac{1}{1 + \exp(\beta_0 + \beta_1 \tilde{p}_t)} \right\}^{I(\gamma_t=1)I(b_t=1)} (1-\lambda)^{I(\gamma_t=1)}.$$

Then, the conditional expected log likelihood function given the observed data $D=\{\gamma_t, b_t: t=1, \ldots, T, b_t=1\}$, denoted by $\bar{\ell}(\theta)$ $$\bar{\ell}(\theta) = \sum_{t:b_t=1} \left\{ I(r_t = 1)\log\lambda + I(r_t = 1, b_t = 1)\log\frac{\exp(\beta_0 + \beta_1 \tilde{p}_t)}{1 + \exp(\beta_0 + \beta_1 \tilde{p}_t)} \right\} + \sum_{t:b_t=1} \left\{ \sum_{g=1}^{G} E\{z_t = g \mid D\} I(r_t = 1, b_t = 1, y_t = k) \right\} \left\{ \log\pi_g(x_i, p_t^k) + \log\frac{\exp(\beta_0 + \beta_1 \tilde{p}_t)}{1 + \exp(\beta_0 + \beta_1 \tilde{p}_t)} \right\}\Bigg\} + \sum_{t:b_t=1} \left[ E\left\{ I(r_t = 1 \mid D) I(b_t = 0) \log\frac{1}{1 + \exp(\beta_0 + \beta_1 \tilde{p}_t)} + E\left\{ \gamma_t = 0 \mid D \right\} \log(1-\lambda) \right] .$$

The maximizer is found by implementing the EM algorithm as follows: For t-th iteration, (E-step) for given t-th updated parameter, embodiments compute:

$$E(r_t = 1 \mid D) = \frac{\lambda\{1 + \exp(\beta_0 + \beta_1 \tilde{p}_t)\}^{-1}}{1 - \lambda\{1 + \exp(\beta_0 + \beta_1 \tilde{p}_t)\}^{-1}} \stackrel{def}{=} \alpha_t,$$

$$\begin{aligned} \tilde{\pi}_g(x_t, p_t^k, y_t) &= E(z_t = g \mid x_t, p_t^k, b_t = 1, r_t = 1, y_t = k) \\ &= Pr(z_t = g \mid x_t, p_t^k, b_t = 1, r_t = 1, y_t = k) \propto \\ &= Pr(z_t = g \mid x_t, p_t^k, b_t = 1, r_t = 1) \times \\ &\quad f(y_t = k \mid x_t, p_t^k, b_t = 1, r_t = 1, z_t = g) \propto \\ &\quad \pi_g(x_t, p_t^k) \times \prod_{k=1}^{K} \frac{\exp(x_t' \delta_k^g + p_t^k \gamma_k^g)}{1 + \exp(x_t' \delta_k^g + p_t^k \gamma_k^g)}^{I(y_t=k)} \end{aligned}$$

where $$\sum_{g=1}^{G} \tilde{\pi}_g(x_t, p_t^k, y_t) = 1$$

and $E(r_t=0|D)=1-\alpha_t$.

(M-step). Obtain the (41)-th updated parameters as follows: compute $$\lambda^{t+1} = \frac{\sum_{t=1}^{T} I(b_t = 1) + I(b_t = 0)\alpha_t}{T}$$

and update $$\left(\beta_0^{t+1}, \beta_1^{t+1}\right)$$

by solving the following equation with respect to ($\beta_0$, $\beta_1$).

$$\sum_{t=1}^{T}\left[I(b_t = 1)\left\{1 - \frac{\exp(\beta_0 + \beta_1\tilde{p}_t)}{1 + \exp(\beta_0 + \beta_1\tilde{p}_t)}\right\} - I(b_t = 0)\alpha_t\frac{\exp(\beta_0 + \beta_1\tilde{p}_t)}{1 + \exp(\beta_0 + \beta_1\tilde{p}_t)}\right](1, \tilde{p}_t) = (0, 0).$$

To update $$\left(\delta_k^{g(t+1)}, \gamma_k^{g(t+1)}\right),$$

solve the equation with respect to $$(\delta_k^g, \gamma_k^g).$$

$$\sum_{t:b_t=1}^{T} I(r_t = 1)\sum_{g=1}^{G}\sum_{k=1}^{K}\tilde{\pi}_g\left(x_t, p_t^k, y_t\right)\left\{I(y_t = k) - \frac{\exp\left(x_t'\delta_k^g + p_t^k\gamma_k^g\right)}{1 + \sum_{k=2}^{K}\exp\left(x_t'\delta_k^g + p_t^k\gamma_k^g\right)}\right\}\left(x_t, p_t^k\right) = (0, 0).$$

Then, repeat (E-step) and (M-step) until a criterion meets.

This estimation method implicitly assumes that the number of cluster G is known. Since G is unknown in practice, the best G is chosen for given data. In one embodiment, 10-fold cross validation is used and G is chosen minimizing the misclassification rate. BIC is also available. If G=1 is selected, then the proposed personalized demand function based on the mixture MNL model is a classical MNL model commonly used in practice. In other words, the classical MNL model is a special case of the above model.

FIG. 7 illustrates an example of a likelihood function in accordance to one embodiment. The likelihood function is used at 208 of FIG. 2 in eliminating insignificant variables. The likelihood function shown in FIG. 7 combines a Poisson arrival process ($r_t$), a binomial booking process ($b_t$) and a mixture multinomial logit purchase choice process ($d_t$) into a single model.

Variable Selection

Further in connection with 208 and the variable selection, FIG. 8 illustrates a variable selection algorithm in accordance to an embodiment. As shown in FIG. 8, a Lasso penalty function uses 10-fold cross validation to suppress insignificant parameters. The parameters are coefficients corresponding to each variable either observed or latent in the regression model, which are estimated to give the best fit for the model given the set of observations.

Embodiments specify K, which is a lasso penalty tuning parameter that enables to choose the best model. Note that (E-step) is the same as the E-step disclosed above because the penalized log-likelihood function is the conditional expected log-likelihood function with adding a function of the parameter $$\left|\delta_{kj}^g\right| + \left|\gamma_k^g\right|,$$

which is not a latent variable. (M-step) for $$\left|\delta_{kj}^g\right| + \left|\gamma_k^g\right|$$

needs to be modified due to the penalty function. After completing (E-step), a maximizer of the objective function in FIG. 8 is then determined. The only difference between the expected log-likelihood function disclosed above and function in FIG. 8 is the last term in the right side, which is the penalty function of $$\left|\delta_{kj}^g\right| + \left|\gamma_k^g\right|$$

for j=1, . . . , p, k=1, . . . , K and g=1, . . . , G. The (t+1)th updated parameters are the same as in the previous (M-step). Now, the maximizer of the expected log-likelihood function in FIG. 8 is determined with respect to $$\left|\delta_{kj}^g\right| + \left|\gamma_k^g\right|.$$

Equivalently, the maximizer of the following part of the objective function can be determined:

$$\sum_{t:b_t=1}\left\{\sum_{g=1}^{G}\sum_{k=1}^{K}\tilde{\pi}_g\left(x_t, p_t^k, y_t\right)I(r_t = 1, b_t = 1, y_t = k)\left\{\log\frac{\exp\left(x_t'\delta_k^g + p_t^k\gamma_k^g\right)}{1 + \exp\left(x_t'\delta_k^g + p_t^k\gamma_k^g\right)}\right\}\right\} - \sum_{g=1}^{G}\kappa_p\sum_{k=1}^{K}\sum_{j=1}^{P}\left\{\left|\delta_{kj}^g\right| + \left|\gamma_k^g\right|\right\} =$$

$$\sum_{t:b_t=1} I(r_t = 1)\left\{\sum_{g=1}^{G}\sum_{k=1}^{K}\tilde{\pi}_g\left(x_t, p_t^k, y_t\right)I(y_t = k)\left(x_t'\delta_k^g + p_t^k\gamma_k^g\right) - \log\left\{1 + \exp\left(x_t'\delta_k^g + p_t^k\gamma_k^g\right)\right\}\right\} - \sum_{g=1}^{G}\kappa_p\sum_{k=1}^{K}\sum_{j=1}^{P}\left\{\left|\delta_{kj}^g\right| + \left|\gamma_k^g\right|\right\} \overset{\text{let}}{=}$$

$$\ell\left(\left|\delta_{kj}^g\right| + \left|\gamma_k^g\right|\right) - \sum_{g=1}^{G}\kappa_p\sum_{k=1}^{K}\sum_{j=1}^{P}\left\{\left|\delta_{kj}^g\right| + \left|\gamma_k^g\right|\right\}.$$

The Newton algorithm to find the maximizer under the multinomial logistic regression can be tedious, because of the vector nature of the response observations. To avoid these numerical complexities, embodiments use the coordinate descent algorithm disclosed in Friedman, J. et al., “Regularization paths for generalized linear models via coordinate descent”, Journal of Statistical Software, 33(1), 1 (2010), herein incorporated by reference.

Embodiments perform partial Newton steps by forming a partial quadratic approximation to the log-likelihood function $$\ell(\delta_{kj}^g + \gamma_k^g)$$

defined as above, allowing only $$(\delta_{kj}^g + \gamma_k^g)$$

to vary for a single class at a time, for each k and g. The partial quadratic approximation can be shown to be given by $$\ell(\delta_{kj}^g + \gamma_k^g) = -\frac{1}{2B}\sum_{t:b_t=1} I(\gamma_t = 1) w_{tk}\tilde{\pi}_g(x_t, p_t^k, y_t)(z_{tk} - x_t'\delta_k^g + p_t^k\gamma_k^g))^2 + C(\tilde{\delta}_{tk}^g + \tilde{\gamma}_k^g),$$

where B is the number of the booking observations, C(·) is a constant function, and $$z_{tk} = x_t'\delta_k^g + p_t^k\gamma_k^g + \frac{I(y_t = k) - \tilde{p}_{tk}^g}{\tilde{p}_{tk}^g(1 - \tilde{p}_{tk}^g)}$$

$$w_{tk} = \tilde{p}_{tk}^g(1 - \tilde{p}_{tk}^g)\pi_g(x_t)$$

$$\tilde{p}_{tk}^g = \frac{\exp(x_t'\delta_k^g + p_t^k\gamma_k^g)}{1 + \sum_{k=2}^K \exp(x_t'\delta_k^g + p_t^k\gamma_k^g)}$$

In summary, embodiments update the (t+1)th, $$\delta_{kj}^g + \gamma_k^g$$

k=1, . . . , K and g=1, . . . , G in the (M-Step) as follows: obtain the estimates of $$|\delta_{kj}^g| + |\gamma_k^g|$$

by repeating the nested loops: for the mth iteration and g=1, G, repeat the following iteration.

(i) For k=2, . . . , K, compute:

$$z_{tk}^{g(m+1)} = x_t\delta_k^{g(m)} + p_t^k\gamma_k^{g(m)} + \frac{I(y_t = k) - \tilde{p}_{tk}^{g(m)}}{\tilde{p}_{tk}^{g(m)}(1 - \tilde{p}_{tk}^{g(m)})}$$

$$w_{tk}^{g(m+1)} = \tilde{p}_{tk}^{g(m)}(1 - \tilde{p}_{tk}^{g(m)})\pi_g(x_t)$$

$$\tilde{p}_{tk}^{g(m)} = \frac{\exp(x_t'\delta_k^{g(m)} + p_t^k\gamma_k^{g(m)})}{1 + \sum_{k=2}^K \exp(x_t'\delta_k^{g(m)} + p_t^k\gamma_k^{g(m)})}$$

(ii) For j=1, . . . , p, update:

$$\beta_{kj}^{g(m+1)} = \frac{S\left\{\sum_{t=1}^T w_{tk}^{g(m)} x_{tj}\left(z_{tk}^{g(m)} - \tilde{z}_{tk}^{g(m+1)}\right), \kappa_p\right\}}{\sum_{t=1}^T w_{tk}^{g(m)} x_{tj}^2}$$

where $$\tilde{z}_{tk}^{g(m+1)} = \delta_{k0}^{g(m+1)} + \sum_{l<j} x_{tl}\delta_{kl}^{g(m+1)} + \sum_{l>j} x_{tl}\delta_{kl}^{g(m)}$$

and S(z, γ) is the soft-thresholding operator with value;

$$\begin{aligned} S(z,\gamma) &= z - \gamma \quad \text{if } z > 0 \text{ and } \gamma < |z| \\ &= z + \gamma \quad \text{if } z < 0 \text{ and } \gamma < |z| \\ &= 0 \qquad\quad \text{otherwise.} \end{aligned}$$

(iii) Set k=k+1 and go to (i).

The iteration is repeated until a convergence criterion meets.

The following table describes each variable and parameters in the model:

| | | Notation | Description |
|---|---|---|---|
| Variable | Price for room-type k at time t | $p_t^k$ | Key predictor |
| | Covariates except room price at time t | $x_t$ | Auxiliary information |
| | Purchased room type at time t | $y_t$ | Response variable of interest |
| | Arrival variable | $r_t$ | $r_t$ is unobservable for the time t |
| | Booking variable | $B_t$ | |
| Parameter | Arrival probability | λ | |
| | Regression coefficients for booking process | $\beta_0, \beta_1$ | |
| | Regression coefficients for a choice process within each cluster g | $\delta_k^g, \gamma_k^g$ | |

In a regression structure as in the model described above in conjunction with FIG. 6, zero regression coefficient (=parameters) of a variable implies that the variable is deleted from the model. In this sense, suppressing insignificant parameters means that redundant variables' regression coefficients are zero and only the variables with non-zero regression coefficients remain. By suppressing insignificant parameters, embodiments can avoid what is called overfitting the problem. For example, consider a database of hotel reservation transactions that includes the room booked, the guest's information, and the date and time of reservation. It would be easy to construct a model that will fit the training set perfectly by using the date and time of reservation to predict the other attributes. However, this model will not generalize well enough to new data, because those past times will never occur again. The best predictive and fitted model would be where the validation error has its global minimum.

Moreover, many variables make the model complicated. Let p be the number of explanatory variables. The model in embodiments has 1 (arrival process)+2 (booking process)+(G−1)*(K−1)*(p+2), where p is the number of explanatory variables except the price. If there are 4 different room types and 3 clusters, then the number of parameters need to be estimated is 1+2+2*3*(p+2), which increases in p. As the number of parameters increases, the model complexity also increases and the prediction accuracy based on the complex model could get worse. Therefore, embodiments choose a simpler model by removing insignificant variables according to the parsimony principle.

In connection with 212, the following pricing policy algorithm can be used to determine personalized pricing:

$$\text{Revenue}(P_j) = \sum_{j \in \text{ all room categories}} p_j f_j(x, p)$$

The personalized demand model (e.g., FIG. 6) can be used for developing personalized pricing policies to maximize the hotel revenue. The total revenue would change as a function of the price of each room type. In one embodiment, the price for one room type can be varied at a time and the total revenue can be plotted.

As an example of using the generated model to predict the possibility of a particular guest selecting a certain room category, consider an example that uses the following experimental dataset: (1) Downtown hotel in Sydney, Australia; (2) 2 years of booking data from January, 2012-January, 2014; (3) Three different room types ($$ Suite>$$ Deluxe>$$ Superior); (4) Two different room features: City View, Water View; (5) Number of total reservations: 2,503; (6) Average booking days in advance: 10.29 days; (7) Average length of stay: 1.84 days.

Using the above dataset, the best model was: # of Clusters (G)=2 has the lowest BIC. A single MNL was used as a benchmark, which did not consider the no-purchase case or clustering. 70% of the data was used for training, and 30% was used for testing. The following performance measure was used:

$$\text{Performance measure : misclassification ratio} = \frac{\sum_{test\ data} I(\text{true } y \neq \text{predicted } y)}{\#\text{observations in the test}}$$

The following is the preference order of Room Types ($$ Suite>$$ Deluxe>$$ Superior): (1) Deluxe—City View; (2) Deluxe—Water View; (3) Suite—City View; (4) Suite—Water View; (5) Superior—City View; (6) Superior—Water View.

FIGS. 9 and 10 illustrate the results of embodiments of the invention using the experimental dataset to predict the possibility of a particular guest selecting a certain room category. In FIG. 10, 64 coefficients out of 157 coefficients that were set to zero implies that the corresponding variables were excluded from the model. Embodiments use the LASSO method for variable selection. Since a simpler model is used due to selecting some variables, not using all the variables, the prediction accuracy is improved by avoiding the problem overfitting.

Figure 11:
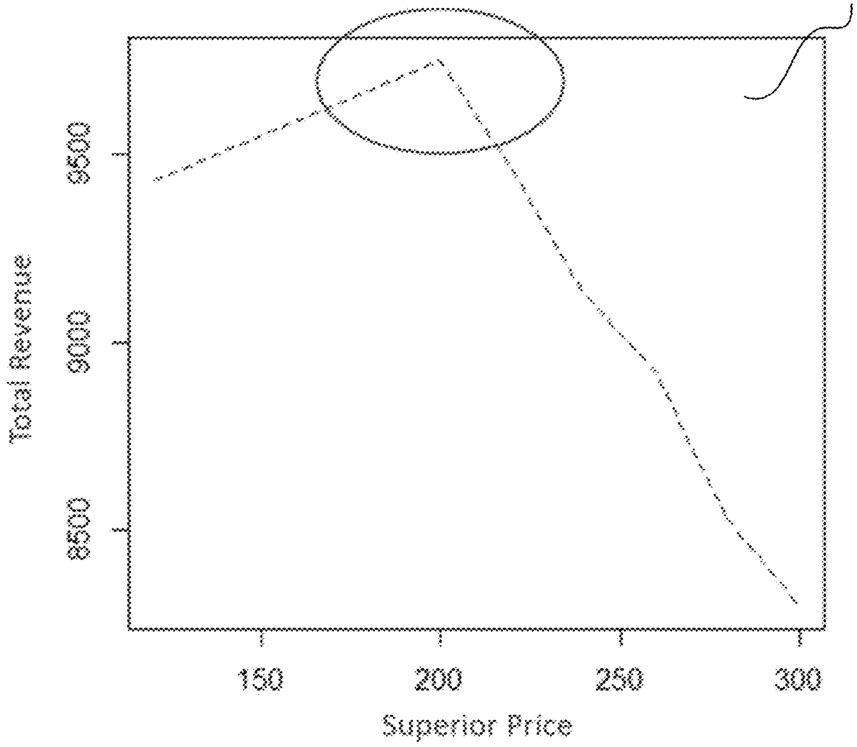
FIG. 11 illustrates the results of an experimental study in accordance to embodiments of the invention.

FIG. 11 illustrates the results of an experimental study in accordance to embodiments of the invention. In the study, the inventory of rooms are shown at table 1102. The price for the Superior room is varied while keeping all other prices constant and the total revenue is plotted at 1104. As shown, the maximum revenue is determined to be when the superior room price is set at $200.

As disclosed, embodiments provide personalized demand modeling for the hotel rooms based on the guest attributes. Embodiments use machine learning to cluster reservations based on guest attributes, travel attributes, and external factors prior to applying the demand choice-based model to estimate the price elasticity and willingness-to-pay of each guest cluster for different room features.

Embodiments assume that there are several clusters of guests and fit a multinomial choice model for each cluster. When those clustering mechanisms are unobservable, embodiments use a combination of soft-clustering and EM-algorithm as estimation method. Based on the clustered mixture typed choice model, embodiments define an expected revenue and solve the optimization problem to determine the optimal price, which maximizes the expected revenue to each room type for each guest.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of modeling demand and pricing for hotel rooms, the method comprising:

receiving historical data regarding a plurality of previous guests, the historical data comprising a plurality of attributes comprising guest attributes, travel attributes and external factors attributes, the historical data generated in part by a hotel booking system used to reserve hotel rooms;

generating first observed variables corresponding to guests that accessed the hotel booking system and booked a hotel room;

generating first unobserved variables corresponding to a first estimate of guests that accessed the hotel booking system and did not book the hotel room after accessing the hotel booking system;

generating second unobserved variables corresponding to a second estimate of guests that have not accessed the hotel booking system;

wherein the generating the first unobserved variables and the second unobserved variables comprises dividing a day into a plurality of discrete time slots that are sized so that during each discrete time slot, at most one guest may have accessed the hotel booking system at an arrival time t, where tis modeled as a Bernoulli distribution;

generating a plurality of distinct clusters based the plurality of attributes, including the guest attributes, travel attributes and external factors attributes, using machine learning clustering and allowing each guest to belong to multiple clusters;

segmenting each of the previous guests into one or more of the distinct clusters;

building a separate mixture multinomial logit model (MNL) model that corresponds to each of the distinct clusters, each MNL model predicting a probability of a guest selecting a certain room category and comprising a plurality of variables corresponding to the attributes, the plurality of variables including first observed variables, the first unobserved variables and the second unobserved variables, each MNL model comprising MNL model parameters, the MNL model parameters comprising a probability of belonging to each of the distinct clusters, an arrival rate and covariate parameters;

eliminating insignificant variables of each of the MNL models using a Lasso regularization method to set coefficients for the insignificant variables to zero by maximizing a penalized likelihood function of the mixture MNL models;

estimating the MNL model parameters of the models using an Expectation Maximization (EM) algorithm, the MNL model parameters comprising coefficients corresponding to the variables, the estimating comprising receiving a plurality of updates of the model parameters and iteratively fitting each model until a convergence criterion is met after receiving each of the updates, the iteratively fitted models predicting an arrival rates of guests to the hotel booking system, and predicting a booking choice of each of the guests that arrive at the hotel booking system;

determining optimized pricing of the hotel rooms based on an objective function using the estimated model parameters from each iteratively fitted model and a personalized pricing algorithm, the optimized pricing comprising a prediction on whether a user will select the priced hotel room; and displaying each optimized priced hotel room on the booking system as a selectable hotel room reservation.

2. The method of claim 1, wherein the machine learning soft clustering comprises random-forest based soft clustering.

3. The method of claim 1, the second unobserved variables comprising guests having a desire for the hotel room that do not access at the hotel booking system.

4. The method of claim 1, the determination of the first estimate and second estimate comprising distinguishing between the first unobserved variables and the second unobserved variables, wherein, for an assumed access at a time slot based on the Bernoulli distribution, a logistic regression model determines a booking during the time slot.

5. The method of claim 1, wherein the optimized pricing comprises for a plurality of different types of rooms of a hotel, assigning an optimized price for each of the different types, the optimized pricing maximizing revenue.

6. The method of claim 1, wherein the penalized likelihood function comprises a Poisson arrival process, a binomial booking process and a mixture multinomial logit purchase choice process combined in a single model.

7. A non-transitory computer readable medium having instructions stored thereon that, when executed by one or more processors, cause the processors to optimize pricing for hotel rooms, the optimization comprising:

receiving historical data regarding a plurality of previous guests, the historical data comprising a plurality of attributes comprising guest attributes, travel attributes and external factors attributes, the historical data generated in part by a hotel booking system used to reserve hotel rooms;

generating first observed variables corresponding to guests that accessed the hotel booking system and booked a hotel room;

generating first unobserved variables corresponding to a first estimate of guests that accessed the hotel booking system and did not book the hotel room after accessing the hotel booking system;

generating second unobserved variables corresponding to a second estimate of guests that have not accessed the hotel booking system;

wherein the generating the first unobserved variables and the second unobserved variables comprises dividing a day into a plurality of discrete time slots that are sized so that during each discrete time slot, at most one guest may have accessed the hotel booking system at an arrival time t, where tis modeled as a Bernoulli distribution;

generating a plurality of distinct clusters based the plurality of attributes, including the guest attributes, travel attributes and external factors attributes, using machine learning clustering and allowing each guest to belong to multiple clusters;

segmenting each of the previous guests into one or more of the distinct clusters;

building a separate mixture multinomial logit model (MNL) model that corresponds to each of the distinct clusters, each MNL model predicting a probability of a guest selecting a certain room category and comprising a plurality of variables corresponding to the attributes, the plurality of variables including first observed variables, the first unobserved variables and the second unobserved variables, each MNL model comprising MNL model parameters, the MNL model parameters comprising a probability of belonging to each of the distinct clusters, an arrival rate and covariate parameters;

eliminating insignificant variables of each of the MNL models using a Lasso regularization method to set coefficients for the insignificant variables to zero by maximizing a penalized likelihood function of the mixture MNL models;

estimating the MNL model parameters of the models using an Expectation Maximization (EM) algorithm, the MNL model parameters comprising coefficients corresponding to the variables, the estimating comprising receiving a plurality of updates of the model parameters and iteratively fitting each model until a convergence criterion is met after receiving each of the updates, the iteratively fitted models predicting an arrival rates of guests to the hotel booking system, and predicting a booking choice of each of the guests that arrive at the hotel booking system;

determining optimized pricing of the hotel rooms based on an objective function using the estimated model parameters from each iteratively fitted model and a personalized pricing algorithm, the optimized pricing comprising a prediction on whether a user will select the priced hotel room; and displaying each optimized priced hotel room on the booking system as a selectable hotel room reservation.

8. The computer readable medium of claim 7, wherein the machine learning soft clustering comprises random-forest based soft clustering.

9. The computer readable medium of claim 7, the second unobserved variables comprising guests having a desire for the hotel room that do not access at the hotel booking system.

10. The computer readable medium of claim 7, the determination of the first estimate and second estimate comprising distinguishing between the first unobserved variables and the second unobserved variables, wherein, for an assumed access at a time slot based on the Bernoulli distribution, a logistic regression model determines a booking during the time slot.

11. The computer readable medium of claim 7, wherein the optimized pricing comprises for a plurality of different types of rooms of a hotel, assigning an optimized price for each of the different types, the optimized pricing maximizing revenue.

12. The computer readable medium of claim 7, wherein the penalized likelihood function comprises a Poisson arrival process, a binomial booking process and a mixture multinomial logit purchase choice process combined in a single model.

13. A hotel room pricing system comprising:

one or more processors coupled to stored instructions; and a database storing reservation preferences and room features;

the processors configured to receive, from the database, historical data regarding a plurality of previous guests, the historical data comprising a plurality of attributes comprising guest attributes, travel attributes and external factors attributes, the historical data generated in part by a hotel booking system used to reserve hotel rooms, and implement an optimized pricing module that is configured to perform price optimization comprising:

generate first observed variables corresponding to guests that accessed the hotel booking system and booked a hotel room;

generate first unobserved variables corresponding to a first estimate of guests that accessed the hotel booking system and did not book the hotel room after accessing the hotel booking system;

generate second unobserved variables corresponding to a second estimate of guests that have not accessed the hotel booking system;

wherein the generating the first unobserved variables and the second unobserved variables comprises dividing a day into a plurality of discrete time slots that are sized so that during each discrete time slot, at most one guest may have accessed the hotel booking system at an arrival time t, where tis modeled as a Bernoulli distribution;

generate a plurality of distinct clusters based the plurality of attributes, including the guest attributes, travel attributes and external factors attributes, using machine learning clustering and allowing each guest to belong to multiple clusters;

segment each of the previous guests into one or more of the distinct clusters;

build a separate mixture multinomial logit model (MNL) model that corresponds to each of the distinct clusters, each MNL model predicting a probability of a guest selecting a certain room category and comprising a plurality of variables corresponding to the attributes, the plurality of variables including first observed variables, the first unobserved variables and the second unobserved variables, each MNL model comprising MNL model parameters, the MNL model parameters comprising a probability of belonging to each of the distinct clusters, an arrival rate and covariate parameters;

eliminate insignificant variables of each of the MNL models using a Lasso regularization method to set coefficients for the insignificant variables to zero by maximizing a penalized likelihood function of the mixture MNL models;

estimate the MNL model parameters of the models using an Expectation Maximization (EM) algorithm, the MNL model parameters comprising coefficients corresponding to the variables, the estimating comprising receiving a plurality of updates of the model parameters and iteratively fitting each model until a convergence criterion is met after receiving each of the updates, the iteratively fitted models predicting an arrival rates of guests to the hotel booking system, and predicting a booking choice of each of the guests that arrive at the hotel booking system;

determine optimized pricing of the hotel rooms based on an objective function using the estimated model parameters from each iteratively fitted model and a personalized pricing algorithm, the optimized pricing comprising a prediction on whether a user will select the priced hotel room; and display each optimized priced hotel room on the booking system as a selectable hotel room reservation.

14. The system of claim 13, the second unobserved variables comprising guests having a desire for the hotel room that do not access at the hotel booking system.

15. The system of claim 13, the determination of the first estimate and second estimate comprising distinguishing between the first unobserved variables and the second unobserved variables, wherein, for an assumed access at a time slot based on the Bernoulli distribution, a logistic regression model determines a booking during the time slot.

16. The system of claim 13, wherein the machine learning soft clustering comprises random-forest based soft clustering.

17. The system of claim 13, wherein the optimized pricing comprises for a plurality of different types of rooms of a hotel, assigning an optimized price for each of the different types, the optimized pricing maximizing revenue.

18. The system of claim 13, wherein the penalized likelihood function comprises a Poisson arrival process, a binomial booking process and a mixture multinomial logit purchase choice process combined in a single model.

* * * * *